United States Patent
Denworth et al.

(10) Patent No.: US 11,687,146 B1
(45) Date of Patent: Jun. 27, 2023

(54) POWER CONSUMPTION CONTROL

(71) Applicant: VAST DATA LTD., Tel Aviv (IL)

(72) Inventors: Jeff Denworth, Tel Aviv (IL); Shachar Fienblit, Tel Aviv (IL); Yogev Vaknin, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/652,929

(22) Filed: Feb. 28, 2022

(51) Int. Cl.
*G06F 1/32* (2019.01)
*G06F 1/3287* (2019.01)
*G06F 1/3206* (2019.01)

(52) U.S. Cl.
CPC .......... *G06F 1/3287* (2013.01); *G06F 1/3206* (2013.01)

(58) Field of Classification Search
CPC .............................. G06F 1/3287; G06F 1/3206
See application file for complete search history.

(56) References Cited

U.S. PATENT DOCUMENTS

| | | | |
|---|---|---|---|
| 10,558,586 B1* | 2/2020 | Paterra | G06F 12/1408 |
| 2013/0132967 A1* | 5/2013 | Soundararajan | G06F 16/172 709/201 |
| 2019/0114114 A1* | 4/2019 | Trika | H03M 13/154 |

* cited by examiner

*Primary Examiner* — Stefan Stoynov
(74) *Attorney, Agent, or Firm* — Reches Patents (57) ABSTRACT

A method for power management of a storage system unit, the method may include selecting a power reduction measure out of (a) a shutdown of at least one stateless compute node out of stateless compute nodes of the storage system unit, and (b) an other power reduction measure that does not involve the shutdown of the at least one stateless compute node, while prioritizing the shutdown of the at least one stateless compute node over the other power reduction measure; wherein the storage system unit further comprises storage nodes; wherein states related to communications with client computers (i) are maintained in the storage nodes, and (ii) are not stored on the stateless compute nodes; and applying the power reduction measure based on the selecting.

27 Claims, 3 Drawing Sheets

POWER CONSUMPTION CONTROL

BACKGROUND

Since data centers host many components that consume electric power, data center administrators are required to look for controlling the power consumption, so as to increase overall energy efficiency and avoid power peaks. Storage systems compose major consumers of data center power consumption. A power consumption limitation may be applied for a set of racks that includes one or more racks containing multiple components that compose a storage system. The power consumption limitation may be a requirement raised by a storage system administrator. There is a growing need to provide an effective power consumption control method.

SUMMARY

There may be provide a storage system, a method and a non-transitory computer readable medium for power consumption control.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

A storage system may include a set of racks that includes one or more racks containing multiple components that compose a storage system. The components housed in a rack are hardware and software boxes that include compute nodes and storage nodes whose power may be read, and other components whose power may not be read or controlled, but may be determined as consuming a certain (e.g. maximal) power consumption declared by the manufacturer. The maximal power consumption of the set of racks may be configured, and the aim is to avoid exceeding the maximal power consumption.

The compute nodes are servers (or part of servers) that implement the logic of the storage system and does not store any data and metadata, and does not even store states of the system and of ongoing processes being executed by the compute nodes, including states of user commands within a session. Any data, metadata and states are stored in various memory and storage devices of the storage nodes only. The storage nodes are servers that only implement low level housekeeping of the storage devices, such as monitoring the health of the devices. The compute nodes communicate with the storage nodes over a communication fabric.

The power consumption of each rack and/or of the set of racks is monitored for determining whether the power consumption has crossed a first power threshold. The first power threshold may be a major portion of the power consumption limit (the maximal power allowed), e.g., 95% of the power consumption limit. The current power consumption may be calculated by summing the current power level consumed by the compute nodes and storage nodes plus the fixed value of power consumption (as documented by the manufacturer as the highest power level, or any power level according to environment conditions) of components whose power consumption level is not readable (e.g., switches that connect the compute nodes and storage nodes).

When detecting that the power consumption has crossed the first power threshold, it may be determined to reduce the power consumption by applying various measures.

When the monitored power consumption of the rack drops below a second power threshold (e.g., 85%) that is lower than the first power threshold, it can be determined to undo any measures that were taken for reducing the power consumption.

Figure 1:
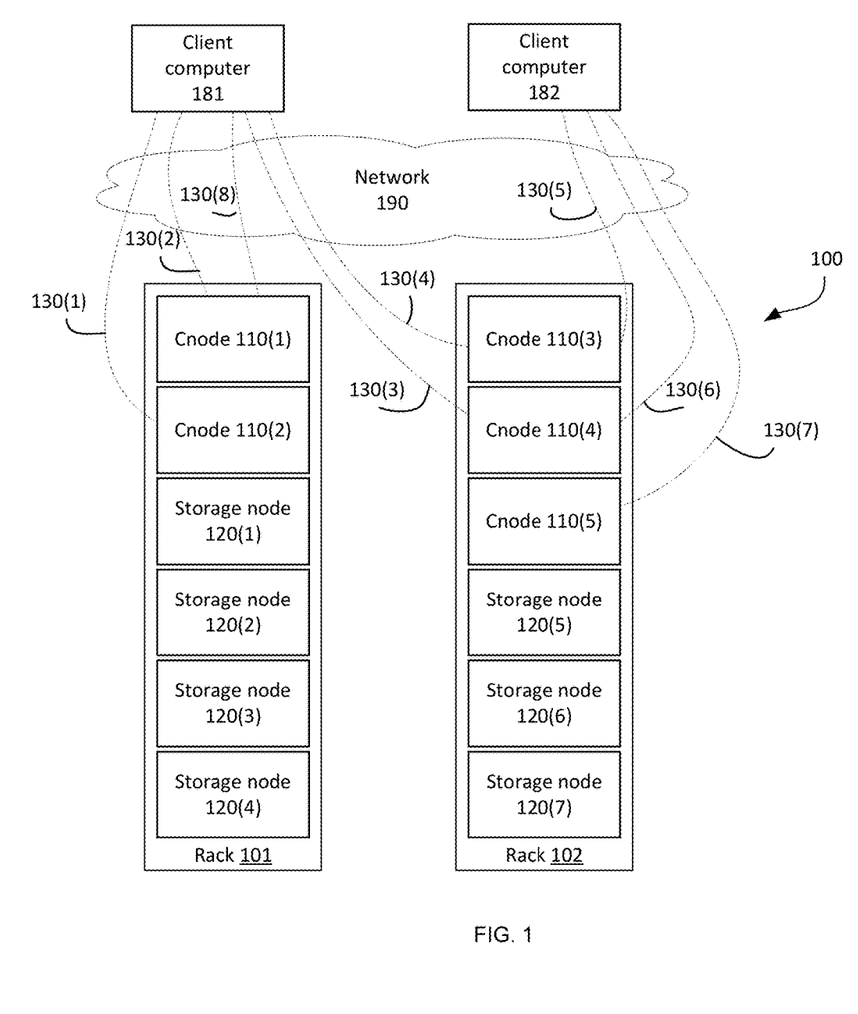
FIG. 1 illustrates an example of a client computers and a storage system unit.

FIG. 1 illustrates a storage system that includes two racks 101 and 102. Rack 101 includes compute nodes 110(1) and 110(2) and four storage nodes 120(1)-120(4), and rack 102 includes three compute nodes 110(3)-110(5) and three storage nodes 120(5)-120(7).

Client computers 181 and 182 are coupled to the compute nodes for accessing stored data. Each client can access the stored data by sending access requests to one or multiple compute nodes that the client is configured to access. The compute nodes can access any of the storage nodes for accessing the data stored therein. When enabling the client to access multiple compute nodes, the performance (e.g., latency, throughput, bandwidth) of the storage system, as experienced by the client, is improved, since more compute resources and more network resources are available to the client.

FIG. 1 illustrates client computer 181 as being coupled to four compute nodes 110(1) and 110(2) of rack 101 and compute nodes 110(3) and 110(4) of rack 102. The coupling to the four compute nodes is enabled by network connections 130(1)-130(4). Client computer 181 can access compute node 110(1) by using multiple connections, such as connections 130(2) and 130(8). By using more than one connection towards compute node 110(1), the bandwidth between the client and the compute node can be increased. Client computer 182 is coupled to three compute nodes 110(3)-110(5) of rack 102, via network connections 130(5)-130(7). The network connections may be IP (Internet Protocol) addresses. Network connections 130(4) and 130(5) that connect the two client computers to the same compute node, may be the same or different IP addresses. The same applied to network connections 130(3) and 130(6).

One of the compute nodes may include a power manager module that detects the need to reduce power consumption, as well as selecting the measures to handle the reduction of the power consumption. The power manager may otherwise be a computer that is separate from the compute nodes.

The measures for reducing the power consumption may include shutting down compute nodes and reducing the writes to the flash devices hosted in the storage nodes.

According to one embodiment of the invention, shutting down a compute node may be preferred over other measures because a power relief is immediately gained from the shutdown of the compute node, and given that the compute nodes are stateless (does not store any states) and all the states are stored in the storage nodes that are accessible to all the compute nodes, the shutdown process is immediate and does not involve copying of states that were handled by the compute node to a storage space that is accessible to other compute nodes that take over responsibilities of the shutdown node.

According to another embodiment, the measures to reduce power can be selected as either: shutting down one or more compute nodes or reducing the writes towards the storage nodes.

The measure selection may be based on a write pattern that is detected, during a certain time window that preceded the measure selection, or a write pattern that is typical to the time frame when the selection is made, based on historical monitoring of the write pattern.

For example, it may be detected that the number of write requests is high but the written sizes are short i.e., a vast number of short write requests enter the system. Thus, when—a relation between the total write size and the number of write requests and is low (below a certain threshold, e.g., an average of 4 KB per write), and in addition, the number of write requests per second is higher than a write threshold, then it can be determined that the power consumption is due to excessive computation performed by the compute nodes for handling the vast number of requests, where the total amount of written data is relatively low, and does not impose a heavy power load on the storage nodes. Therefore, when detecting such write pattern, it may be determined to shutdown a compute node. On the other hand, if a reverse pattern is detected, where a small number of write requests received by the system involve large sized data, i.e., a relation between the total write size and the number of write requests and the is high (e.g., above 100 KB, above 1 MB, etc.) in addition to a small number of received write requests per second, then it can be determined that reducing the writes is preferred over shutting down a compute node.

When determining to shut down a compute node, at least one compute node that is a candidate for shutting down can be selected according to various criteria.

Since all the states and metadata handled by the compute node are stored in the storage nodes, the shutting down of the compute node may only involve re-assigning the IP addresses assigned to the shutdown compute node to other compute nodes, so that the access of the client computers to the storage system is not interrupted, when accessing the IP addresses of the shutdown compute node. The other compute node that receives client requests addressed to the re-assigned IP addresses, can serve the requests by using the states and metadata that were stored by the shutdown compute node in the storage nodes, even if the shutdown was performed in a middle of sessions between the client computer and the shutdown compute node.

The selection of the compute node may be based on resources that will remain available to at least one client that is coupled to the candidate compute node, after a shutdown of the candidate compute node. For example, it can be determined that the communication bandwidth between the at least one client and the storage system should not drop below a certain bandwidth, or that the computation resources available to the at least one client should not drop below a certain computation amount.

For example, client computer 181 is coupled to the storage system via five network connections, and client computer 182 is coupled to the storage system via three network connections. Assuming all the connections provides the same bandwidth, it may be preferred to shut down a compute node associated with a connection that couples client computer 181, for example, if compute node 110(1) or 110(2) is selected to be shut down, then client computer 181 will be still connected to the storage system via at least three connections. Furthermore, it may be determined not to shut down compute node 110(1) given it provides more bandwidth (via two connections) to at least one client computer (181). If different connections provide different bandwidth, then the some of the bandwidth of all connection may be taken into account.

It may be determined to avoid selecting a compute node whose shutdown will decrease any client's bandwidth below a certain bandwidth threshold, or to avoid a situation where a client is coupled to the storage system via less than two or less than one (or any other selected number of) compute nodes.

Flash power consumption is mostly guided by write flows, so by controlling writes, the power that the system consumes can be reduced. Therefore, the power reduction may be also achieved by reducing the number of writes towards the storage nodes of the one or more racks whose power consumption has exceeded the first power threshold.

In this case, the power manager may request each compute node in the system to reduce the write bandwidth to the SSDs hosted in the storage nodes of the one or more racks whose power consumption has been violated.

The write bandwidth may be reduced by throttling incoming write requests. The reduction may be by a portion (e.g., 10%) of the recent monitored write bandwidth and the power manager may request the compute nodes to limit the write bandwidth to the reduced write bandwidth. The reduction of the write bandwidth includes delaying incoming write requests related to the excess write bandwidth that exceeds the reduced write bandwidth.

The delayed write requests related to the excess write bandwidth are transmitted when a variable time window elapsed. The variable time window includes a fixed time window (e.g., 1 second) known to all compute nodes, plus a variable short period (e.g., −0.01 to +0.01) that is randomly selected by each compute node. The variable part is added, so that not all the compute nodes will release the excess delayed write requests at the same time. The next window of each compute node starts when the previous window ended.

Limiting the write requests may be also achieved by postponing non-urgent background processes. For example, the system may use a storage space that is composed of non-flash memories, preferably non-volatile memories, e.g., NVRAM (Non-Volatile Random Access Memory), that is used for temporarily storing data received from the clients. The NVRAM may include a vast number of write buffers that can hold the data before migrating the data to the SSDs. In case, there is a need to limit writes to the SSDs, and there is an adequate number of free write buffers that can hold the received data without needing to evict the data from the write buffers, for at least a certain time period, then the migration process is slowed down, and may be even suspended if the slowdown does not cause the power to drop below the second power threshold. The migration may be resumed after the certain time period when the power reduction is successful. If a suspension of the migration does not achieve an adequate power reduction, or if a resume of the migration causes the power to re-exceed the first power threshold, then the delaying of incoming write requests can be applied.

Figure 2:
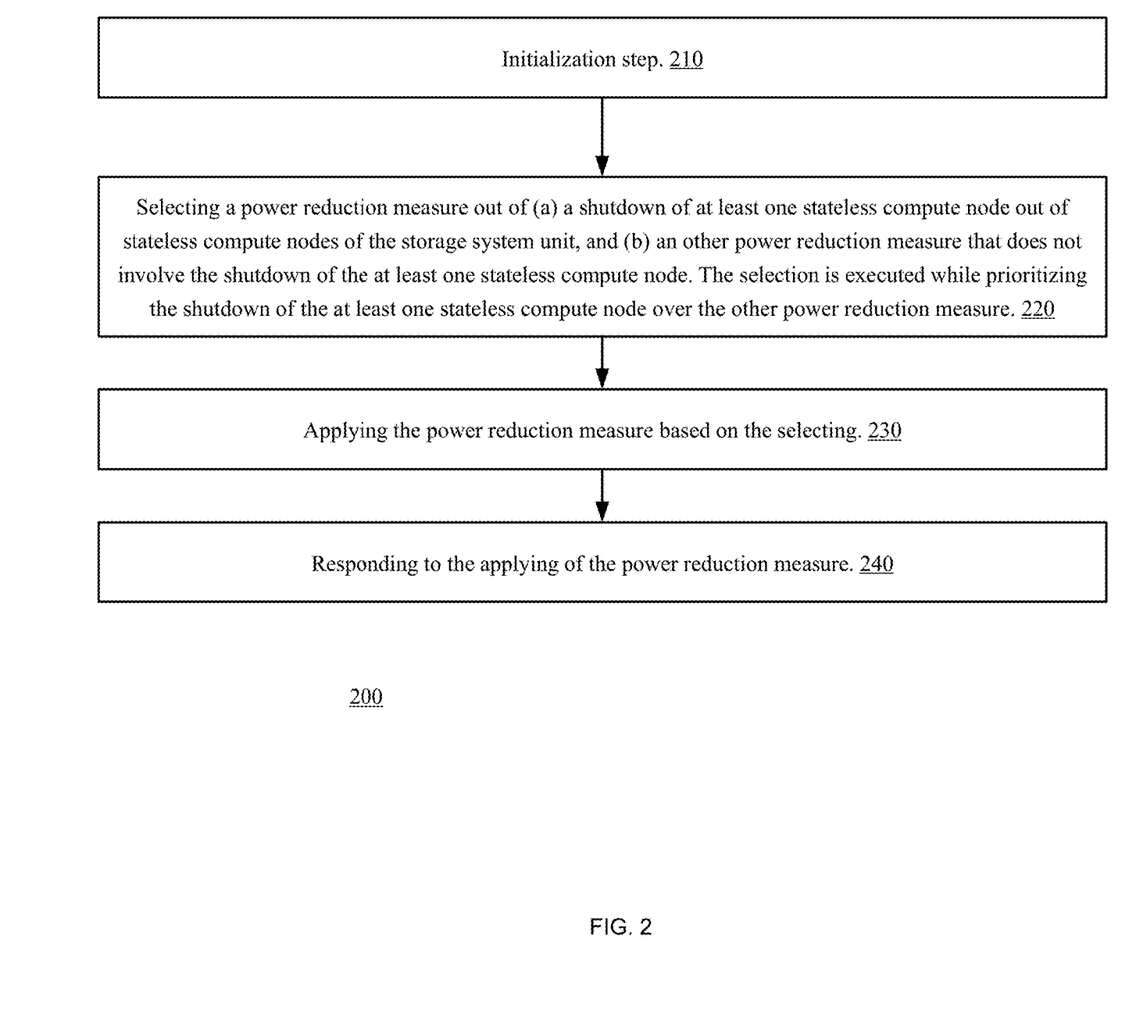
FIG. 2 illustrates an example of a method.

FIG. 2 illustrates an example of method 200 for power management of a storage system unit. The storage system unit may be a rack, multiple racks or any combination of storage nodes, stateless compute nodes, and power consuming elements that differ from the storage nodes and the compute nodes (for example—one or more switches, one or more network devices that facilitate communication among the storage nodes and the stateless compute nodes, and the like).

A compute node is stateless in the sense that states—such as states related to communications with client computers (i) are maintained in the storage nodes, and (ii) are not stored on the stateless compute nodes.

When maintained in the storage nodes—the states related to communications with client computers may be accessible to stateless compute nodes—and especially to all stateless compute nodes (of the storage system unit) that are not shutdown.

Method 200 may start by initialization step 210.

Step 210 may include at least one out of:
 a. Estimating a power consumption of at least one power consuming element without measuring the power consumption of the at least one power consuming element.
 b. Estimating a total power consumption of the storage system unit. The estimating may include summing power consumption of power consuming elements whose power can be read (e.g., storage nodes and compute nodes) and estimated power consumption of other power consuming elements.
 c. Determining whether the power reduction measure is required.
 d. Receiving an indication or a request or a command to perform the power reduction measure.
 e. Comparing a power consumption of the storage system unit to a threshold or to a policy limit.
 f. Determining an amount of required energy reduction based on one or more write request patterns related to one or more of the client computers.
 g. Increasing a priority of selecting to perform the shutdown of the at least one stateless compute node over the other power reduction measure when sensing a write request pattern that exhibits an average writing data unit size below a first size threshold and a number of write requests that exceeds a first write request number threshold.
 h. Decreasing a priority of selecting to perform the shutdown of the at least one stateless compute node over the other power reduction measure when sensing a write request pattern that exhibits an average writing data unit size above a second size threshold and a number of write requests that is below a second write request number threshold.

Any step of (a)— (h) may refer to the entire storage system unit, to any part of the storage system unit, to one or more clients that access the storage system unit, to an application that accesses the storage system unit, or a combination thereof.

Step 210 may be followed by step 220 of selecting a power reduction measure out of (a) a shutdown of at least one stateless compute node out of stateless compute nodes of the storage system unit, and (b) an other power reduction measure that does not involve the shutdown of the at least one stateless compute node.

The selection made during step 220 is executed while prioritizing the shutdown of the at least one stateless compute node over the other power reduction measure.

The other power reduction measure may include at least one out of:
 a. Reducing a number of communication paths between the storage system unit to the client computers. It should be noted that the reducing may be executed while avoiding reducing a number of communication paths between the storage system unit and a client computer below a predefined number threshold associated with the client computer, or—avoiding reducing the bandwidth between the storage system unit and a client computer below a predefined bandwidth threshold. Reducing the number of communication paths may lead to slowing down the pace of access requests from the client, which may alleviate the computation load as well as the write load, which in turn reduce the power consumption.
   b. Delaying a sending from at least one compute node to at least one storage node of data associated with write requests from client computers. The delaying may be of write requests that are associated with excess bandwidth that exceeds a determined reduced bandwidth, required for alleviating the power load.
   c. Delaying a sending, to a client computer, a response to a write request sent by the client computer. The delaying may lead to slowing down the pace of access requests from the client computer.
   d. Delaying background storage management processes.
   e. Delaying migration of data from write buffers of at least one storage nodes of the storage system unit to at least one storage device of the storage nodes. The write buffers may be included in memory devices that consume less power than the at least one storage device where the data is intended to be migrated. For example, the write buffers may be part of a NVRAM memory of the storage nodes, where flash devices are used as a permanent storage of the data after being migrated.
   f. Preventing shutting down a certain compute node, when it is determined that the shutting down will result a reduction of the bandwidth between the storage system unit and a client computer, below a predefined bandwidth threshold.

Step 220 may be followed by step 230 of applying the power reduction measure based on the selecting.

Step 230 may be followed by step 240 of responding to the applying of the power reduction measure.

Step 240 may include at least one out of:
   a. Stopping the applying of the power reduction measure.
   b. Modifying the power reduction measure.
   c. Continuing one or more communication session that a client commuter had with a compute node that was shutdown.

Step (c) may occur, for example when the shutdown occurs in a middle of a communication session between the stateless compute node and a client computer. Step (c) may include having another stateless compute node participate, using a state related to the communication session stored in one or more storage nodes, in the communication session following the shutdown of the stateless compute node.

Figure 3:
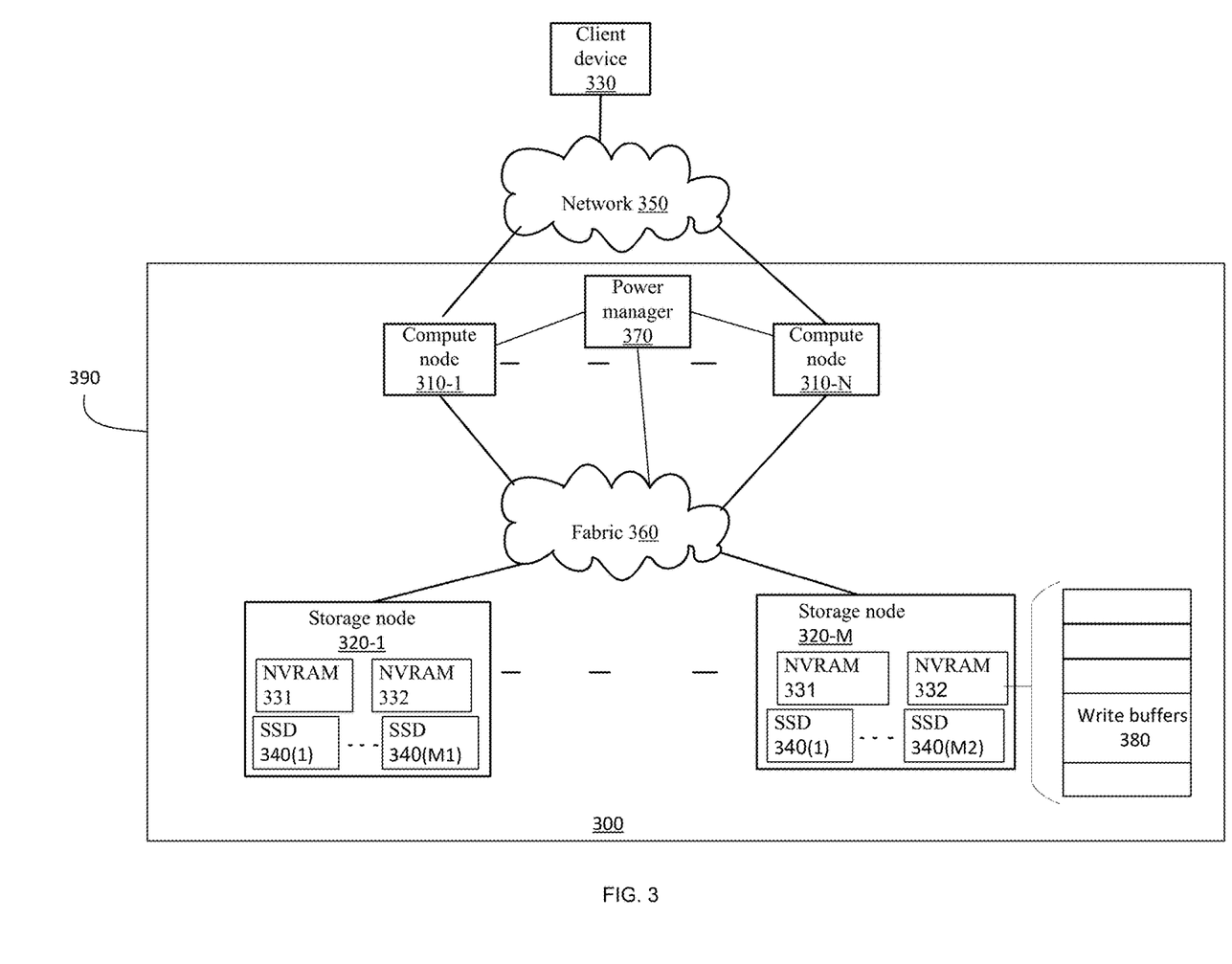
FIG. 3 illustrates an example of a storage system.

FIG. 3 shows an example diagram of a storage system 300 according to the disclosed embodiments. Components of the storage system may be housed in one or more racks, such as rack 390, that compose a storage system unit.

The storage system 300 includes a number of N compute nodes 310-1 through 310-N.

The storage system 100 also includes a number of M storage nodes 320-1 through 320-M. The computer nodes 310 and the storage nodes 320 are connected through a communication fabric 360. M may equal N or may differ from N.

A compute node 310 is configured to perform tasks related to the management of the storage nodes 320. In an embodiment, each compute node 310 interfaces with multiple client devices such as a client device 330 (or an application installed therein) via a network 350. To this end, a compute node 310 is configured to receive requests (e.g., read or write requests) and promptly serve these requests in a persistent manner. The network 350 may be, but not limited to, the Internet, the world-wide-web (WWW), a local area network (LAN), a wide area network (WAN), and the like.

In an embodiment, a compute node 310 is configured to interface with different protocols implemented by the client devices or applications (e.g., TCP/IP, HTTP, FTP, various filesystem protocols, etc.) and to manage the read and write operations to the storage nodes 320. The compute node 310 is further configured to translate the protocol commands into a unified structure (or language). Then, each compute node 310 is also configured to logically address and map all elements stored in the storage nodes 320.

In an embodiment, to efficiently read and write data to the storage nodes 320 from the storage devices, each compute node 310 performs a number of processes including data reduction, data resiliency, and Flash memory management actions (e.g., defragmentation, wear leveling, and so on).

It should be noted that each compute node 310 may operate in the same manner as all other compute nodes 310. In a case of a failure, any compute node 310 can replace the failed node. Further, each compute node may control and manage one or mode storage nodes 320 regardless of the specific architecture of the storage nodes 320. Therefore, there is no coupling between specific compute nodes 310 and specific storage nodes 320. As such, compute nodes can be added to the system 300 without increasing the number of storage nodes (or their capacity), and vice versa, storage nodes can be added without increasing the number of compute nodes 310.

Power manager 370 may be implemented as a standalone computer or may be part of one or more compute nodes.

The storage nodes 320 provide the storage and state in the system 300. To this end, each storage node 320 may include a plurality of SSDs, such as SSDs 340, for example storage node 320-1 includes M1 SSDs 340(1)-340(M1). Each storage node further includes fast accessed memory, such as NVRAM 331 and 332 of FIG. 3. The NVRAM may include write buffers, such as write buffers 380, for temporarily storing data received from the clients. A background process may be executed for migrating data temporarily stored in the write buffers to SSDs 340. The migrating may includes: compression, deduplication, encryption, RAID striping, etc.

A storage node 320 may be configured to communicate with the compute nodes 310 over the communication fabric 360. It should be noted that each compute node 310 can communicate with each storage node 320 over the communication fabric 360. There may not be a direct coupling between a compute node 310 and storage node 320.

In the embodiment, the communication fabric 330 may include an Ethernet fabric, an InfiniBand fabric, and the like. Specifically, the communication fabric 360 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for power management of a storage system unit, the method comprising:
   selecting a power reduction measure out of (a) a shutdown of at least one stateless compute node out of stateless compute nodes of the storage system unit, and (b) an other power reduction measure that does not involve the shutdown of the at least one stateless compute node, while prioritizing the shutdown of the at least one stateless compute node over the other power reduction measure; wherein the storage system unit further comprises storage nodes; wherein states related to communications with client computers (i) are maintained in the storage nodes, and (ii) are not stored on the stateless compute nodes; and
   applying the power reduction measure based on the selecting.

2. The method according to claim 1 wherein the other power reduction measure comprises reducing a number of communication paths between the storage system unit to the client computers.

3. The method according to claim 2 comprising preventing from reducing a number of communication paths between the storage system unit and a client computer below a predefined number threshold associated with the client computer.

4. The method according to claim 1 wherein the other power reduction measure comprises delaying a sending from at least one compute node to at least one storage node of data associated with write requests from client computers.

5. The method according to claim 1 wherein the other power reduction measure comprises delaying sending, to a client computer, a response to a write request sent by the client computer.

6. The method according to claim 1 wherein the other power reduction measure comprises delaying background storage management processes.

7. The method according to claim 1 wherein the other power reduction measure comprises delaying migration of data from write buffers of at least one storage node of the storage system unit to at least one storage device of the storage nodes.

8. The method according to claim 1 wherein the storage system unit comprises one or more storage system racks.

9. The method according to claim 1 comprising selecting to apply the shutdown of the stateless compute node, wherein the shutdown occurs in a middle of a communication session between the stateless compute node and a client computer; wherein the method comprises having an other stateless compute node participate, using a state related to the communication session stored in one or more storage nodes, in the communication session following the shutdown of the stateless compute node.

10. The method according to claim 1 comprising determining an amount of required energy reduction based on one or more write request patterns related to one or more of the client computers.

11. The method according to claim 1 comprising increasing a priority of selecting to perform the shutdown of the at least one stateless compute node over the other power reduction measure when sensing a write request pattern that exhibits an average writing data unit size below a first size threshold and a number of write requests that exceeds a first write request number threshold.

12. The method according to claim 1 comprising decreasing a priority of selecting to perform the shutdown of the at least one stateless compute node over the other power reduction measure when sensing a write request pattern that exhibits an average writing data unit size above a second size threshold and a number of write requests that is below a second write request number threshold.

13. The method according to claim 1 wherein the storage system unit also comprises power consuming elements that differ from the storage nodes and the compute nodes; wherein the method comprises estimating a power consumption of at least one power consuming element without measuring the power consumption of the at least one power consuming element.

14. A non-transitory computer readable medium for power management of a storage system unit, the non-transitory computer readable medium stores instructions for:
    selecting a power reduction measure out of (a) a shutdown of at least one stateless compute node out of stateless compute nodes of the storage system unit, and (b) an other power reduction measure that does not involve the shutdown of the at least one stateless compute node, while prioritizing the shutdown of the at least one stateless compute node over the other power reduction measure; wherein the storage system unit further comprises storage nodes; wherein states related to communications with client computers (i) are maintained in the storage nodes, and (ii) are not stored on the stateless compute nodes; and
    applying the power reduction measure based on the selecting.

15. The non-transitory computer readable medium according to claim 14 wherein the other power reduction measure comprises reducing a number of communication paths between the storage system unit to the client computers.

16. The non-transitory computer readable medium according to claim 15 that stores instructions for preventing from reducing a number of communication paths between the storage system unit and a client computer below a predefined number threshold associated with the client computer.

17. The non-transitory computer readable medium according to claim 14 wherein the other power reduction measure comprises delaying a sending from at least one compute node to at least one storage node of data associated with write requests from client computers.

18. The non-transitory computer readable medium according to claim 14 wherein the other power reduction measure comprises delaying sending, to a client computer, a response to a write request sent by the client computer.

19. The non-transitory computer readable medium according to claim 14 wherein the other power reduction measure comprises delaying background storage management processes.

20. The non-transitory computer readable medium according to claim 14 wherein the other power reduction measure comprises delaying migration of data from write buffers of at least one storage node of the storage system unit to at least one storage device of the storage nodes.

21. The non-transitory computer readable medium according to claim 14 wherein the storage system unit comprises one or more storage system racks.

22. The non-transitory computer readable medium according to claim 14 that stores instructions for (i) selecting to apply the shutdown of the stateless compute node, wherein the shutdown occurs in a middle of a communication session between the stateless compute node and a client computer; and for (ii) having an other stateless compute node participate, using a state related to the communication session stored in one or more storage nodes, in the communication session following the shutdown of the stateless compute node.

23. The non-transitory computer readable medium according to claim 14 that stores instructions for determining an amount of required energy reduction based on one or more write request patterns related to one or more of the client computers.

24. The non-transitory computer readable medium according to claim 14 that stores instructions for increasing a priority of selecting to perform the shutdown of the at least one stateless compute node over the other power reduction measure when sensing a write request pattern that exhibits an average writing data unit size below a first size threshold and a number of write requests that exceeds a first write request number threshold.

25. The non-transitory computer readable medium according to claim 14 that stores instructions for decreasing a priority of selecting to perform the shutdown of the at least one stateless compute node over the other power reduction measure when sensing a write request pattern that exhibits an average writing data unit size above a second size threshold and a number of write requests that is below a second write request number threshold.

26. The non-transitory computer readable medium according to claim 14 wherein the storage system unit also comprises power consuming elements that differ from the storage nodes and the compute nodes; wherein the non-transitory computer readable medium stores instructions for estimating a power consumption of at least one power consuming element without measuring the power consumption of the at least one power consuming element.

27. A storage system unit that comprises:
    stateless compute nodes;
    storage nodes; and
    at least one power manager module;
    wherein the at least one power manager module is configured to:
    select a power reduction measure out of (a) a shutdown of at least one stateless compute node out of stateless compute nodes of the storage system unit, and (b) an other power reduction measure that does not involve the shutdown of the at least one stateless compute node, while prioritizing the shutdown of the at least one stateless compute node over the other power reduction measure; wherein the storage system unit further comprises storage nodes; wherein states related to communications with client computers (i) are maintained in the storage nodes, and (ii) are not stored on the stateless compute nodes; and apply the power reduction measure based on the selection.

\* \* \* \* \*